Patented July 14, 1953

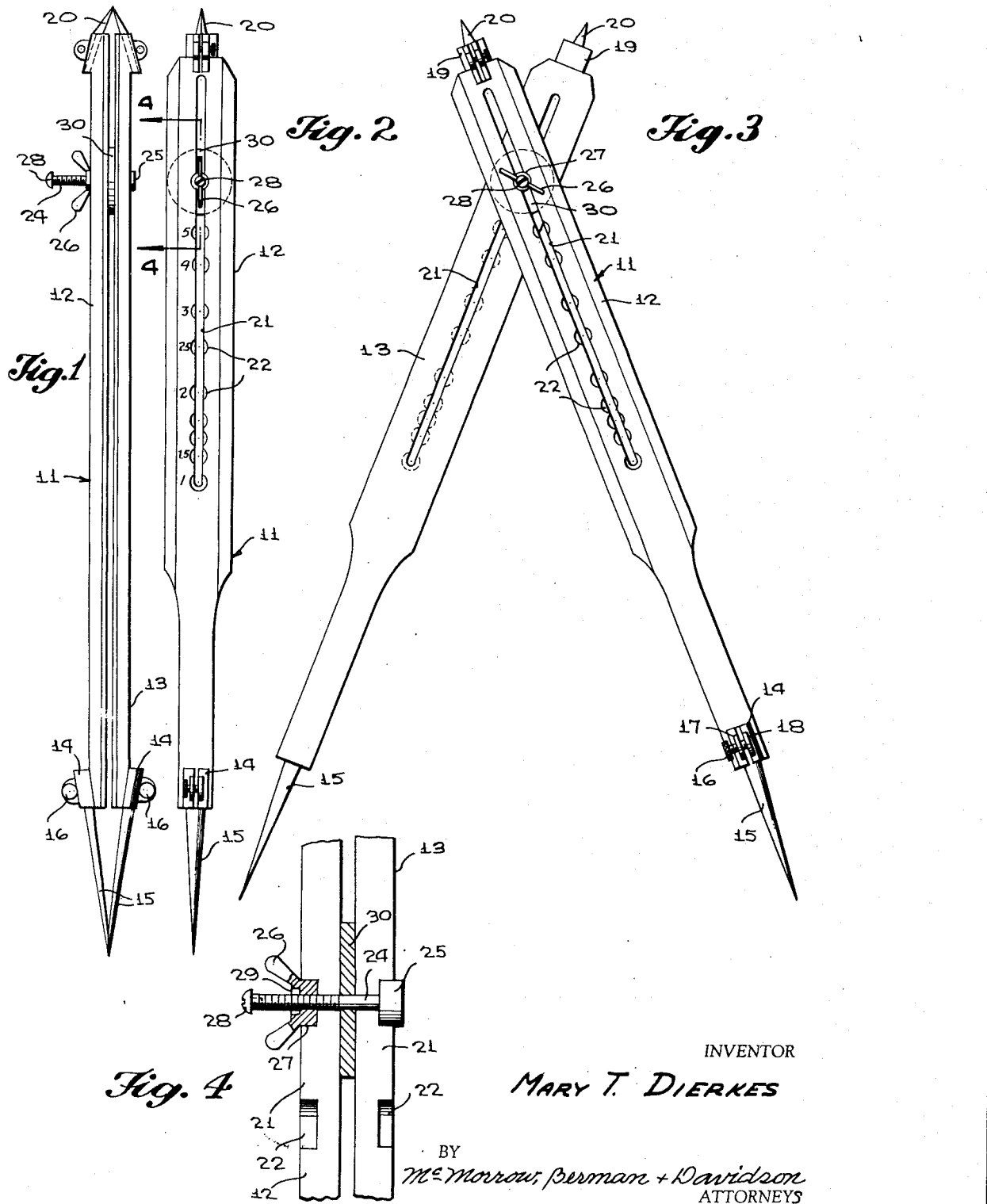

2,645,021

UNITED STATES PATENT OFFICE 2,645,021

PROPORTIONING DIVIDER

Mary T. Dierkes, Long Beach, Calif.

Application January 4, 1952, Serial No. 264,969

3 Claims. (Cl. 33—150)

This invention relates to draftsmen's implements, and more particularly to proportioning dividers.

The main object of the invention is to provide a novel and improved draftsman's proportioning instrument which is simple in construction, which is easy to use, and which will proportion a line of any given length, within the capacity of the instrument, into any equal number of divisions desired, within practical limits.

A further object of the invention is to provide an improved proportioning divider implement for use by draftsmen to reduce or expand engineering drawings to any desired scale, and for similar purposes, the improved instrument involving inexpensive components, being sturdy in construction, being easy to adjust to provide a desired reduction or expansion ratio, and involving only a few parts.

Further objects and advantages of the invention will become apparent from the following description and claims, and from the accompanying drawings, wherein:

Figure 1 is a side elevational view of an improved divider instrument constructed in accordance with the present invention.

Figure 2 is a front elevational view of the instrument of Figure 1.

Figure 3 is a front elevational view, similar to Figure 2, but showing the instrument in spread apart position.

Figure 4 is an enlarged cross sectional detail view taken on the line 4—4 of Figure 2.

Referring to the drawings, the improved implement is designated generally at 11 and comprises a pair of bar members 12 and 13 formed at their lower ends with the split sleeves 14 in which are secured the divider points 15, as by conventional clamping screws 16 engaged through lugs 17 and 18 on the split sleeves 14, the screws 16 being threaded into the lugs 18 and being shouldered to engage the lugs 17, whereby the points 15 are gripped in the sleeves 14 when the screws 16 are tightened. At their top ends, as viewed in Figures 1 to 3, the bars 12 and 13 are also provided with split sleeves 19 in which are secured divider points 20, as by the use of clamping means similar to that employed to secure the divider points 15.

The upper portions of the bar members 12 and 13 are formed with longitudinal slots 21, each slot being formed along its length with the spaced counterbore recesses 22, the spacing of the recesses 22 being the same on the bar member 13 as the spacing of said recesses on the bar member 12.

Designated at 24 is a bolt having a cylindrical head 25 adapted to be received in the arcuate counterbore recesses 22 of the bar member 13 with the shank of the bolt extending through the slots 21 of bar member 13 and bar member 12, as shown in Figure 4, and designated at 26 is a wing nut having a cylindrical body element carried concentrically therewith and designated at 27, said body element being receivable in the arcuate counterbore recesses 22 on the bar member 12 opposite the bolt head 25, as shown in Figure 4. The bolt 24 is formed at its end with an additional head 28 which is receivable in an annular recess 29 formed in body element 27 when the wing nut 26 is moved to the end of the bolt, preventing the wing nut from becoming disengaged from the bolt. Designated at 30 is a washer of friction material, such as of suitable deformable fibre, stiff leather, or other suitable friction material, which is interposed between the bar members 12 and 13 and encircles the bolts 24, as illustrated. By tightening the wing nut 26, the bar members 12 and 13 may be clamped against the friction disc 30, whereby said bar members 12 and 13 will be frictionally held in desired positions of relative angular adjustment after having been manually moved to such adjusted positions.

The counterbore recesses 22 are spaced along the slots 21 to provide various desired reduction ratios between the divider points 15 and the divider points 20. The bar members are provided with suitable scale markings, as shown in Figure 2, indicating the reduction ratio provided by the use of each set of counterbore recesses 22 as the location of the pivotal connection between the arms 12 and 13.

In using the device, when it is desired to obtain a desired reduction ratio, the bolt 24 is moved through the slots 21 of the bar members 12 and 13 until the head of the bolt 25 is engageable in the set of counterbore recesses on the bar member 13, corresponding to the desired reduction ratio. The wing nut 26 is then tightened so that its cylindrical body portion 27 enters the counterbore recesses 22 on the bar member 12, as shown in Figure 4, whereby the implement is ready for use to provide the desired reduction ratio. The distance to be reduced is then established between the divider points 15, 15, and the resultant reduction thereof corresponding to the proportionality established in the setting of the bolt 24, may be laid off between the divider points 20, 20. Obviously, the implement may be employed to provide multiplication of distances by a reverse procedure, the distance to be multiplied being established between the divider points 20, 20 and the resultant multiplied distance being obtained between the divider points 15, 15.

The tightness of the connection between the bar members 12 and 13 may be regulated by adjusting the tightness of the wing nut 26. With the wing nut 26 tightened to a desired degree, the bar members 12 and 13 will be frictionally locked in adjusted position relative to each other by the frictional binding effect provided by friction disc 30. To change the angle between the bar members, the bar members may be manually moved inwardly or outwardly relative to each other against the frictional binding force provided by friction disc 30.

While a specific embodiment of an improved divider instrument has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A divider comprising two bar members having points at their opposite ends, said bar members being formed with longitudinal slots and with a plurality of pairs of opposing recesses spaced along said slots, a headed bolt passing through said slots and pivotally connecting said bar members, the head of the bolt being selectively receivable in the recesses of one bar member, and a nut threadedly engaged on said bolt and being selectively receivable in the recesses of the other bar member.

2. A divider comprising two bar members having points at their opposite ends, said bar members being formed with longitudinal slots and with a plurality of pairs of opposing recesses spaced along said slots, a headed bolt passing through said slots and pivotally connecting said bar members, the head of the bolt being selectively receivable in the recesses of one bar member, a nut threadedly engaged on said bolt and being selectively receivable in the recesses of the other bar member, and a washer of friction material on said bolt between said bar members.

3. A divider comprising two bar members having points at their opposite ends, said bar members being formed with longitudinal slots and with a plurality of pairs of opposing arcuate counterbores spaced along said slots, a bolt passing through said slots and pivotally connecting said bar members, a cylindrical head on said bolt selectively receivable in the arcuate counterbores of one bar member, a nut threadedly engaged on said bolt, a cylindrical body element concentrically carried by said nut and being selectively receivable in the arcuate counterbores of the other bar member, and a washer of friction material on said bolt between said bar members.

MARY T. DIERKES.

References Cited in the file of this patent

UNITED STATES PATENTS

| Number | Name | Date |
|---|---|---|
| 283,907 | Low | Aug. 28, 1883 |
| 911,149 | Moore | Feb. 2, 1909 |